United States Patent
Roundy

(10) Patent No.: US 9,485,272 B1
(45) Date of Patent: Nov. 1, 2016

(54) SYSTEMS AND METHODS FOR ESTIMATING CONFIDENCE SCORES OF UNVERIFIED SIGNATURES

(71) Applicant: Symantec Corporation, Mountain View, CA (US)

(72) Inventor: Kevin Alejandro Roundy, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 95 days.

(21) Appl. No.: 14/307,477

(22) Filed: Jun. 17, 2014

(51) Int. Cl.
 *H04L 29/06* (2006.01)
 *G06F 21/55* (2013.01)
 *G06F 21/56* (2013.01)
 *G06F 21/50* (2013.01)

(52) U.S. Cl.
 CPC ............ *H04L 63/145* (2013.01); *H04L 63/14* (2013.01); *H04L 63/1441* (2013.01); *G06F 21/50* (2013.01); *G06F 21/552* (2013.01); *G06F 21/56* (2013.01); *G06F 21/564* (2013.01); *G06F 21/566* (2013.01); *H04L 63/1408* (2013.01); *H04L 63/1416* (2013.01)

(58) Field of Classification Search
 CPC ............... H04L 63/14; H04L 63/1416; H04L 63/1408; H04L 63/145; H04L 63/1441; G06F 21/50; G06F 21/56; G06F 21/552; G06F 21/566; G06F 21/564
 See application file for complete search history.

(56) References Cited

U.S. PATENT DOCUMENTS

| | | | | |
|---|---|---|---|---|
| 7,352,280 B1* | 4/2008 | Rockwood | ............. | G06F 21/55 340/521 |
| 2005/0283837 A1* | 12/2005 | Olivier | ................. | H04L 63/145 726/24 |
| 2008/0086772 A1* | 4/2008 | Chesla | ................. | H04L 63/145 726/23 |

OTHER PUBLICATIONS

Kuang, Liwei (Vivian) "DNIDS: A Dependable Network Intrusion Detection System Using the CSI-KNN Algorithm", https://qspace.library.queensu.ca/bitstream/1974/671/2/Kuang_Liwei_200709_MSc.pdf, as accessed Apr. 25, 2014, A thesis submitted to the School of Computing in conformity with the requirements for the degree of Master of Science, Queen's University, Kingston, Ontario, Canada, (Sep. 2007).

Yu, Dong et al., "Alert Confidence Fusion in Intrusion Detection Systems with Extended Dempster-Shafer Theory", http://citeseerx.ist.psu.edu/viewdoc/download;jsessionid=FF6509FDC7A1D361CA4AFC293FA41159?doi=10.1.1.188.1103&rep=rep1&type=pdf, as accessed Apr. 25, 2014, 43rd ACM Southeast Conference, Kennesaw, GA, USA, (Mar. 18-20, 2005).

(Continued)

*Primary Examiner* — Kambiz Zand
*Assistant Examiner* — Ayoub Alata
(74) *Attorney, Agent, or Firm* — ALG Intellectual Property, LLC

(57) ABSTRACT

The disclosed computer-implemented method for estimating confidence scores of unverified signatures may include (1) detecting a potentially malicious event that triggers a malware signature whose confidence score is above a certain threshold, (2) detecting another event that triggers another signature whose confidence score is unknown, (3) determining that the potentially malicious event and the other event occurred within a certain time period of one another, and then (4) assigning, to the other signature, a confidence score based at least in part on the potentially malicious event and the other event occurring within the certain time period of one another. Various other methods, systems, and computer-readable media are also disclosed.

20 Claims, 7 Drawing Sheets

(56) References Cited

OTHER PUBLICATIONS

"ArcSight", http://www8.hp.com/us/en/software-solutions/arcsight-express-siem-appliance/tech-specs.html?jumpid=reg_r1002_usen_c-001_title_r0002, as accessed Apr. 25, 2014, Hewlett-Packard Development Company, L.P., (2014).
Kevin Roundy, et al.; Systems and Methods for Identifying Non-Malicious Files on Computing Devices Within Organizations; U.S. Appl. No. 14/750,342, filed Jun. 25, 2015.
Kevin Roundy, et al.; Systems and Methods for Determining the Trustworthiness of Files Within Organizations; U.S. Appl. No. 14/753,051, filed Jun. 29, 2015.
"Stack Overflow", http://stackoverflow.com/, as accessed May 13, 2015, Stack Exchange Inc, (Mar. 1, 2000).
"Yelp", http://www.yelp.com/, as accessed May 13, 2015, (Nov. 28, 1996).
Fanglu Guo, et al.; Systems and Methods for Determining Types of Malware Infections on Computing Devices; U.S. Appl. No. 14/947,878, filed Nov. 20, 2015.
"Managed Security Services", http://www.symantec.com/managed-security-services/, as accessed Sep. 21, 2015, Symantec Corporation, (On or before Sep. 21, 2015).
"Naive Bayes classifier", https://en.wikipedia.org/wiki/Naive_Bayes_classifier, as accessed Sep. 21, 2015, Wikipedia, (Jan. 31, 2005).
"Probabilistic classification", https://en.wikipedia.org/wiki/Probabilistic_classification, as accessed Sep. 21, 2015, Wikipedia, (Aug. 7, 2014).
Lord, Nate, "Common Malware Types: Cybersecurity 101", https://www.veracode.com/blog/2012/10/common-malware-types-cybersecurity-101, as accessed Sep. 21, 2015, Veracode, (Oct. 12, 2012).

\* cited by examiner

SYSTEMS AND METHODS FOR ESTIMATING CONFIDENCE SCORES OF UNVERIFIED SIGNATURES

BACKGROUND

Computer security systems often include a multitude of signatures designed to detect malware attacks. Unfortunately, these signatures may have varying degrees of accuracy. For example, a signature may accurately identify a malware attack but also misdiagnose a wholly innocuous event. Accordingly, this signature may have less than perfect accuracy.

In an effort to account for signatures' varying degrees of accuracy, computer security systems may rely on confidence scores assigned to the signatures. For example, a computer security analyst may manually determine a confidence score of 100% for a signature included in a Security Information and Event Management (SIEM) system. In this example, the 100% confidence score may indicate that the signature is known to accurately identify events that trigger the signature 100% of the time. In other words, while the signature may be unable to detect each and every malware attack, the signature may be able to successfully detect certain malware attacks without any chance of false positives. The SIEM system may subsequently rely on this 100% confidence score in assessing whether an event that triggers the signature actually amounts to a malware attack.

Unfortunately, certain signatures may remain scoreless until undergoing a potentially lengthy verification process. As a result, conventional security systems may be unable and/or reluctant to rely on these unverified signatures, thereby deriving little (if any) value from such signatures. The instant disclosure, therefore, identifies and addresses a need for systems and methods for estimating confidence scores of unverified signatures.

SUMMARY

As will be described in greater detail below, the instant disclosure describes various systems and methods for estimating confidence scores of unverified signatures by leveraging the confidence scores of known high-confidence signatures triggered in close time proximity to the unverified signatures.

In one example, a computer-implemented method for estimating confidence scores of unverified signatures may include (1) detecting a potentially malicious event that triggers a malware signature whose confidence score is above a certain threshold, (2) detecting another event that triggers another signature whose confidence score is unknown, (3) determining that the potentially malicious event and the other event occurred within a certain time period of one another, and then (4) assigning, to the other signature, a confidence score based at least in part on the potentially malicious event and the other event occurring within the certain time period of one another.

In some examples, the method may also include determining that the confidence score of the malware signature indicates a substantially maximum level of confidence in the accuracy of the malware signature. In such examples, the method may further include assigning a confidence score to the other signature based at least in part on the confidence score of the malware signature. This confidence score assigned to the other signature may indicate a substantially maximum level of confidence in the accuracy of the other signature.

In some examples, the method may also include determining that the potentially malicious event and the other event occurred substantially simultaneously. In such examples, the method may further include assigning the confidence score to the other signature based at least in part on the potentially malicious event and the other event occurring substantially simultaneously.

In some examples, the method may also include determining an amount of time that separated the occurrences of the potentially malicious event and the other event. In such examples, the method may further include calculating a confidence score for the other signature by applying the amount of time that separated the occurrences of the potentially malicious event and the other event to an algorithmic function (such as a Gaussian function). Additionally or alternatively, the method may include assigning the calculated confidence score to the other signature.

In some examples, the method may also include detecting the potentially malicious event and the other event on each of a plurality of computing devices. In such examples, the method may further include determining that the potentially malicious event and the other event occurred within the certain time period of one another on each of the plurality of computing devices. Additionally or alternatively, the method may include assigning the confidence score to the other signature based at least in part on the potentially malicious event and the other event occurring within the certain time period of one another on each of the plurality of computing devices.

In some examples, the method may also include detecting one or more potentially malicious events on a single computing device. These potentially malicious events may trigger one or more malware signatures whose confidence scores are above a certain threshold and below another threshold. In such examples, the method may further include determining that the potentially malicious events and the other event occurred within the certain time period of one another on the single computing device. Additionally or alternatively, the method may include calculating a confidence score for the other signature based at least in part on (1) the number of potentially malicious events detected on the single computing device and (2) the confidence scores of the potentially malicious events detected on the single computing device. Moreover, the method may include assigning the calculated confidence score to the other signature.

In some examples, the method may also include detecting one or more potentially malicious events that trigger one or more malware signatures whose confidence scores are above a certain threshold. In such examples, the method may further include detecting one or more instances of the other event that triggers the other signature whose confidence score is unknown. Additionally or alternatively, the method may include determining the number of potentially malicious events and the number of instances of the other event that occurred within a certain window of time. Moreover, the method may include calculating a confidence score for the other signature by dividing the number of potentially malicious events by the number of instances of the other event and then assigning the calculated confidence score to the other signature.

In some examples, the method may also include updating a signature database that facilitates distribution of signatures to computing devices within a user base to account for the confidence score assigned to the other signature. In such examples, the method may further include enabling the computing devices within the user base to leverage the confidence score assigned to the other signature in assessing suspicious events detected on the computing devices.

In one example, a system for implementing the above-described method may include (1) a detection module, stored in memory, that (A) detects a potentially malicious event that triggers a malware signature whose confidence score is above a certain threshold and (B) detects another event that triggers another signature whose confidence score is unknown, (2) a determination module, stored in memory, that determines that the potentially malicious event and the other event occurred within a certain time period of one another, (3) a confidence module, stored in memory, that assigns, to the other signature, a confidence score based at least in part on the potentially malicious event and the other event occurring within the certain time period of one another, and (4) at least one processor that executes the detection module, the determination module, and the confidence module.

In one example, the above-described method may be encoded as computer-readable instructions on a non-transitory computer-readable medium. For example, a computer-readable medium may include one or more computer-executable instructions that, when executed by at least one processor of a computing device, may cause the computing device to (1) detect a potentially malicious event that triggers a malware signature whose confidence score is above a certain threshold, (2) detect another event that triggers another signature whose confidence score is unknown, (3) determine that the potentially malicious event and the other event occurred within a certain time period of one another, and then (4) assign, to the other signature, a confidence score based at least in part on the potentially malicious event and the other event occurring within the certain time period of one another.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
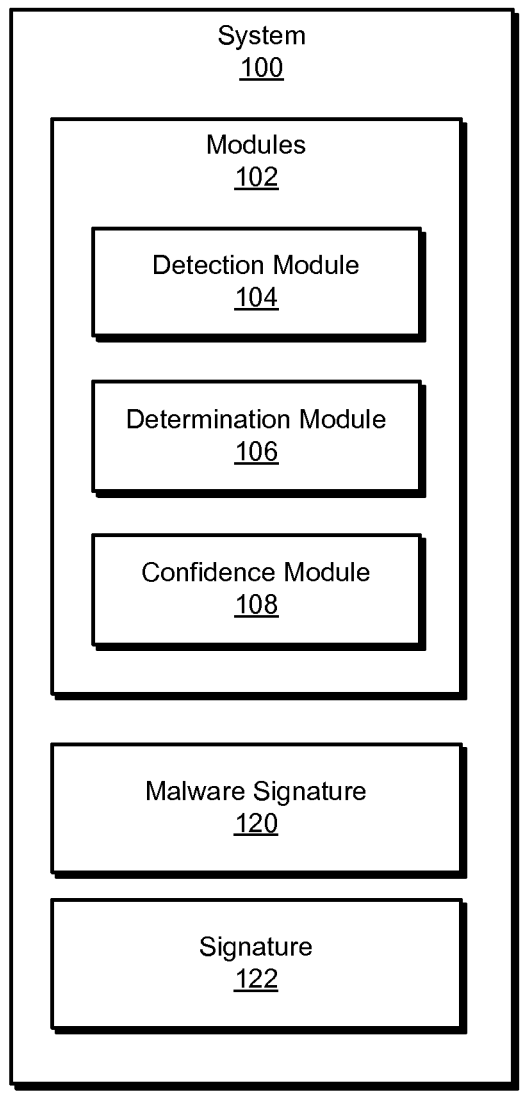
FIG. 1 is a block diagram of an exemplary system for estimating confidence scores of unverified signatures.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for estimating confidence scores of unverified signatures. As will be explained in greater detail below, by leveraging confidence scores of known high-confidence signatures triggered in close time proximity to unverified signatures, the systems and methods described herein may fairly accurately estimate confidence scores for the unverified signatures. In doing so, the systems and methods described herein may enable computer security systems to use and/or rely on such signatures before completion of a full verification process that tries and tests these signatures over a potentially lengthy period of time. Accordingly, the systems and methods described herein may enable such computer security systems to derive certain value from these otherwise unverified signatures.

Figure 2:
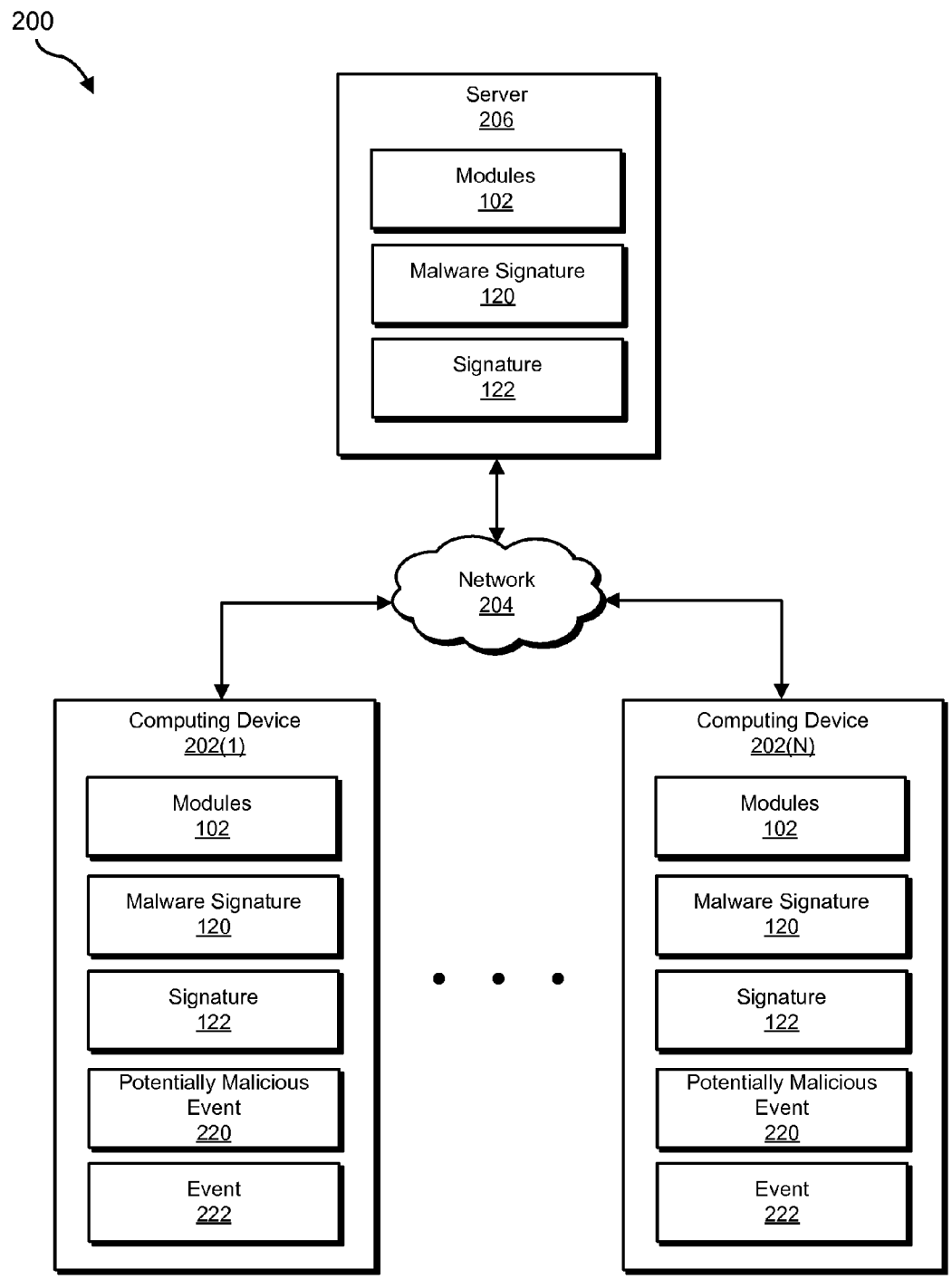
FIG. 2 is a block diagram of an additional exemplary system for estimating confidence scores of unverified signatures.

The following will provide, with reference to FIGS. 1-2, detailed descriptions of exemplary systems for estimating confidence scores of unverified signatures. Detailed descriptions of corresponding computer-implemented methods will be provided in connection with FIG. 3. Detailed descriptions of exemplary confidence scores will be provided in connection with FIG. 4. Detailed descriptions of an exemplary Gaussian distribution for estimating confidence scores of unverified signatures will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for estimating confidence scores of unverified signatures. As illustrated in this figure, exemplary system 100 may include one or more modules 102 for performing one or more tasks. For example, and as will be explained in greater detail below, exemplary system 100 may include a detection module 104 that (1) detects a potentially malicious event that triggers a malware signature whose confidence score is above a certain threshold and (2) detects another event that triggers another signature whose confidence score is unknown. Exemplary system 100 may also include a determination module 106 that determines that the potentially malicious event and the other event occurred within a certain time period of one another.

In addition, and as will be described in greater detail below, exemplary system 100 may include a confidence module 108 that assigns, to the other signature, a confidence score based at least in part on the potentially malicious event and the other event occurring within the certain time period of one another. Although illustrated as separate elements, one or more of modules 102 in FIG. 1 may represent portions of a single module or application (such as SYMANTEC ENTERPRISE SECURITY MANAGER, SYMANTEC SECURITY INFORMATION MANAGER (SSIM), SYMANTEC MANAGED SECURITY SERVICES (MSS), SYMANTEC SECURITY GATEWAY, MCAFEE ENTERPRISE SECURITY MANAGER, MCAFEE ALL ACCESS, MCAFEE TOTAL PROTECTION, MCAFEE INTERNET SECURITY, ACCELOPS' SIEM, HEWLETT-PACKARD'S ARCSIGHT, RSA's ENVISION, CISCO SECURITY MONITORING, ANALYSIS and RESPONSE SYSTEM (MARS), and/or IMMUNESECURITY LOGPOINT).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more signatures, such as malware signature 120. The terms "signature" and "malware signature," as used herein, generally refer to any type or form of hash, data pattern, and/or heuristic designed to detect malware and/or potentially malicious events. In one example, malware signature 120 may be designed to detect a specific malware attack and/or infection. Examples of such malware include, without limitation, computer viruses, computer worms, Trojan horses, spyware, adware, rootkits, malicious botnets, social engineering attacks, combinations of one or more of the same, or any other type of malware.

In some examples, malware signature 120 may have a confidence score that is above, below, or equal to a certain threshold. The term "confidence score," as used herein, generally refers to any type or form of value, label, and/or classification that represents the level of confidence in the accuracy and/or reliability of a signature. For example, malware signature 120 may have a confidence score of 100%. In this example, the 100% confidence score may indicate that that malware signature 120 is known to accurately identify triggering events 100% of the time. In other words, malware signature 120 may be able to successfully detect malware without any chance of false positives.

In another example, malware signature 120 may have a confidence score of 80%. In this example, the 80% confidence score may indicate that that malware signature 120 is known to accurately identify triggering events approximately 80% of the time. In other words, malware signature 120 may misdiagnose approximately 20% of triggering events, thereby potentially resulting in false positives approximately 20% of the time.

As illustrated in FIG. 1, exemplary system 100 may also include one or more other signatures, such as signature 122. In one example, signature 122 may be designed to detect a specific malware attack and/or infection. However, signature 122 may have yet to be assigned a confidence score. As a result, the level of confidence in the accuracy of signature 122 may remain unknown.

Exemplary system 100 in FIG. 1 may be implemented in a variety of ways. For example, all or a portion of exemplary system 100 may represent portions of exemplary system 200 in FIG. 2. As shown in FIG. 2, system 200 may include one or more of computing devices 202(1)-(N) in communication with a server 206 via a network 204. In one example, computing devices 202(1)-(N) may each be programmed with one or more of modules 102. Additionally or alternatively, computing devices 202(1)-(N) may each include malware signature 120 and/or signature 122.

In one example, one or more of computing devices 202(1)-(N) may detect a potentially malicious event 220 that triggers malware signature 120. The term "potentially malicious event," as used herein, generally refers to any type or form of event and/or occurrence that is suspected of being (or potentially amounts to) a malware attack and/or infection. Examples of potentially malicious event 220 include, without limitation, events that potentially occur in connection with computer viruses, computer worms, Trojan horses, spyware, adware, rootkits, malicious botnets, social engineering attacks, combinations of one or more of the same, or any other type of potentially malicious event.

Additionally or alternatively, one or more of computing devices 202(1)-(N) may detect an event 222 that triggers signature 122. The term "event," as used herein, generally refers to any type or form of event and/or occurrence detected on a computing device. Examples of event 222 include, without limitation, events that potentially occur in connection with computer viruses, computer worms, Trojan horses, spyware, adware, rootkits, malicious botnets, social engineering attacks, combinations of one or more of the same, or any other type of event.

In one example, server 206 may be programmed with one or more of modules 102. Additionally or alternatively, server 206 may include malware signature 120 and/or signature 122. Server 206 may facilitate distribution of malware signature 120 and/or signature 122 to one or more of computing devices 202(1)-(N) via network 204.

In one embodiment, one or more of modules 102 from FIG. 1 may, when executed by at least one processor of computing devices 202(1)-(N) and/or server 206, enable one or more of computing devices 202(1)-(N) and/or server 206 to estimate confidence scores of unverified signatures. For example, and as will be described in greater detail below, one or more of modules 102 may cause one or more of computing devices 202(1)-(N) and/or server 206 to (1) detect potentially malicious event 220 that triggers malware signature 120 whose confidence score is above a certain threshold, (2) detect event 222 that triggers signature 122 whose confidence score is unknown, (3) determine that potentially malicious event 220 and event 222 occurred within a certain time period of one another, and then (4) assign, to signature 122, a confidence score based at least in part on potentially malicious event 220 and event 222 occurring within the certain time period of one another.

Computing devices 202(1)-(N) generally represent any type or form of computing device capable of reading computer-executable instructions. Examples of computing devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device capable of maintaining and/or facilitating distribution of signatures. Examples of server 206 include, without limitation, security servers, application servers, web servers, storage servers, and/or database servers configured to run certain software applications and/or provide various security, web, storage, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, a Power Line Communications (PLC) network, a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing devices 202(1)-(N) and server 206.

Figure 3:
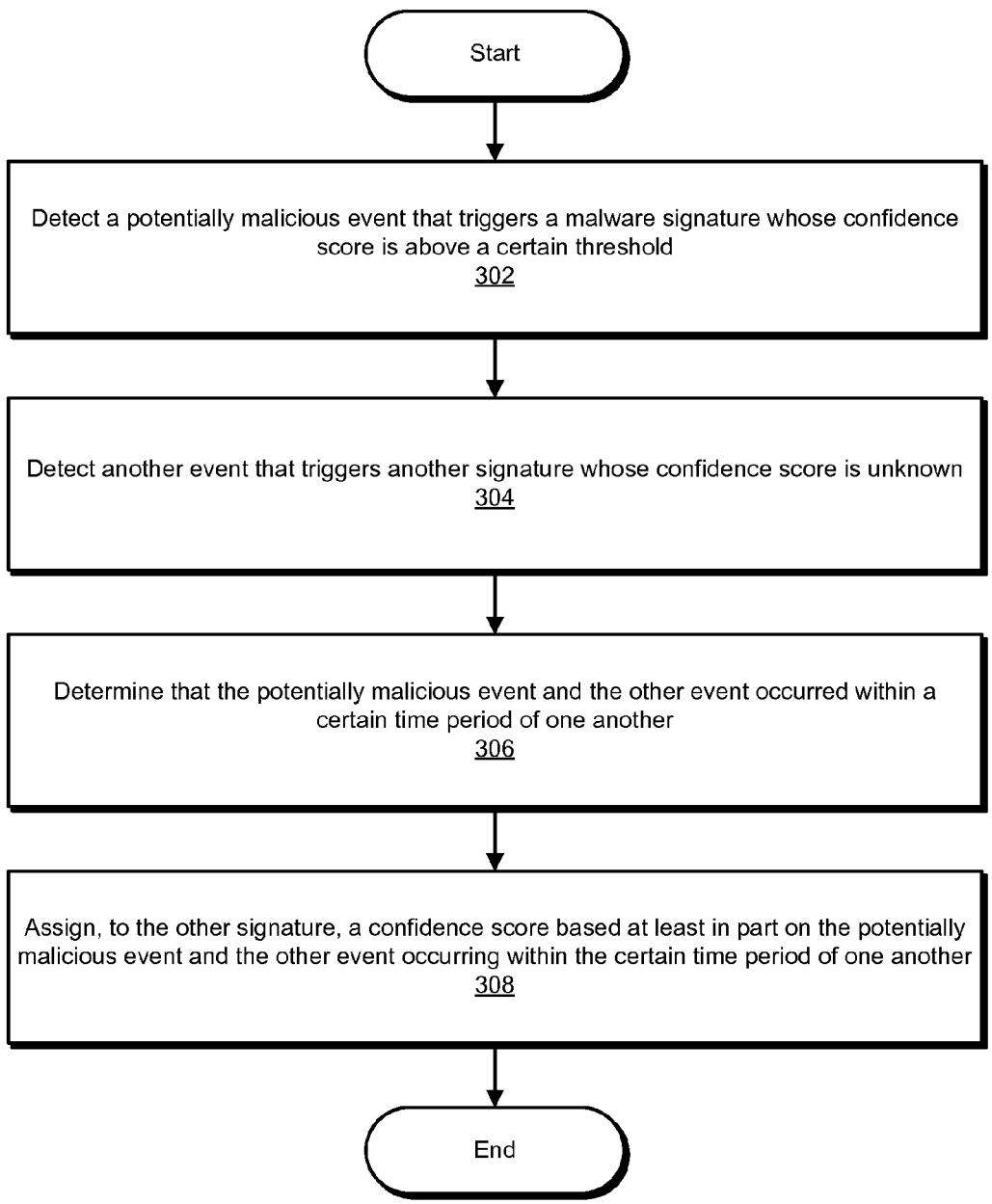
FIG. 3 is a flow diagram of an exemplary method for estimating confidence scores of unverified signatures.

FIG. 3 is a flow diagram of an exemplary computer-implemented method 300 for estimating confidence scores of unverified signatures. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may detect a potentially malicious event that triggers a malware signature whose confidence score is above a certain threshold. For example, detection module 104 may, as part of one or more of computing devices 202(1)-(N) and/or server 206 in FIG. 2, detect potentially malicious event 220 that triggers malware signature 120. In this example, malware signature 120 may have a confidence score that is above or equal to a certain threshold. The phrase "to trigger," as used herein, generally refers to any situation, circumstance, and/or condition in which a signature matches at least a partial representation of an event.

The systems described herein may perform step 302 in a variety of ways. In some examples, detection module 104 may detect potentially malicious event 220 while monitoring the health of a computing device. For example, detection module 104 may monitor computing device 202(1) for any evidence of malware attacks and/or infections. While monitoring computing device 202(1) for such evidence, detection module 104 may detect potentially malicious event 220 that triggers malware signature 120. In other words, detection module 104 may determine that malware signature 120 matches at least a partial representation of potentially malicious event 220.

Additionally or alternatively, detection module 104 may detect potentially malicious event 220 during a malware scan. For example, detection module 104 may initiate and/or participate in a malware scan on computing device 202(1). During this malware scan, detection module 104 may detect potentially malicious event 220 that triggers malware signature 120. In other words, detection module 104 may determine that malware signature 120 matches at least a partial representation of potentially malicious event 220.

Figure 4:
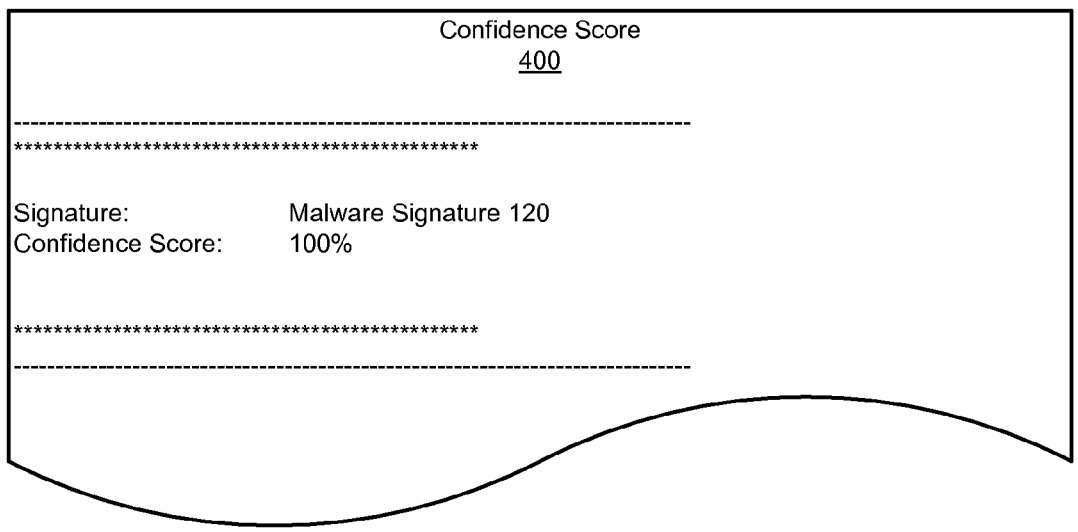
FIG. 4 is an illustration of exemplary confidence scores.
Figure 4:
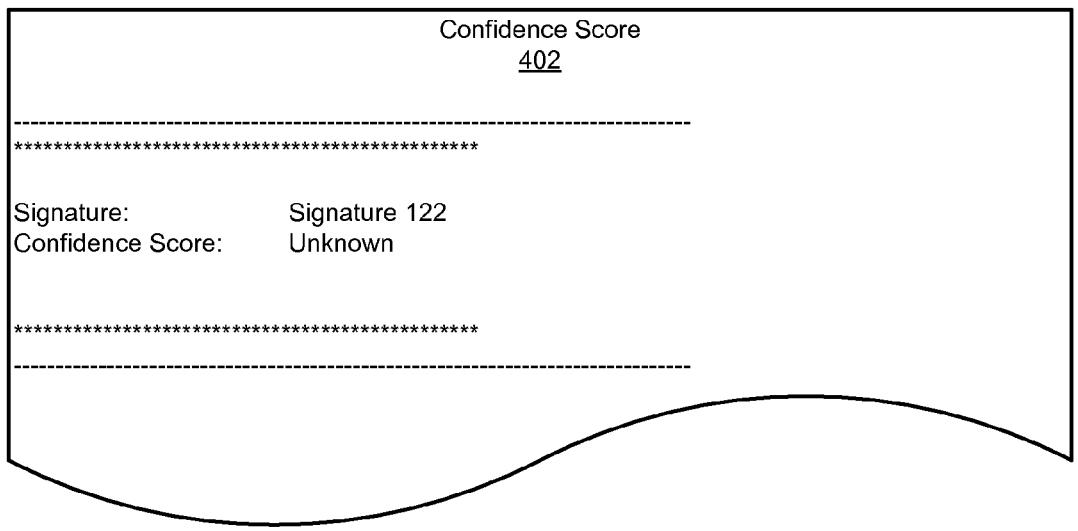

In one example, the confidence score of malware signature 120 may indicate a substantially maximum level of confidence in the accuracy of malware signature 120. The term "substantially maximum level of confidence," as used herein, generally refers to any type or form of confidence level between 95% and 100%. For example, malware signature 120 may have a confidence score 400 in FIG. 4. As shown in FIG. 4, confidence score 400 may indicate a 100% level of confidence in the accuracy of malware signature 120. In other words, confidence score 400 may indicate that malware signature 120 is known to accurately identify triggering events without any chance of false positives.

In one example, detection module 104 may detect potentially malicious event 220 on each of a plurality of computing devices. For example, detection module 104 may detect an instance of potentially malicious event 220 on each of computing devices 202(1)-(N). In this example, computing devices 202(1)-(N) may represent a portion of a user base. Additionally or alternatively, computing devices 202(1)-(N) may represent portions of a plurality of user bases. The term "user base," as used herein, generally refers to any grouping and/or collection of users and/or user devices that implement a specific computing product.

In one example, detection module 104 may detect various potentially malicious events within a certain time period of one another on a single computing device. For example, detection module 104 may detect 5 potentially malicious events on computing device 202(1) over a sliding 24-hour window of time. The 5 potentially malicious events detected on computing device 202(1) may include one or more instances of potentially malicious event 220.

Continuing with this example, the 5 potentially malicious events may each trigger a malware signature whose confidence score is above a certain threshold. For example, each malware signature triggered by the 5 potentially malicious events may have a confidence score of 100%. Accordingly, these confidence scores may each indicate a substantially maximum level of confidence in the accuracy of the corresponding malware signature.

Additionally or alternatively, the potentially malicious events may each trigger a malware signature whose confidence score is above a certain threshold and below another threshold. For example, each malware signature triggered by the potentially malicious events may have a confidence score somewhere between 30% and 70%. Accordingly, none of these confidence scores may necessarily indicate a particularly high level of confidence in the accuracy of the corresponding malware signature.

Returning to FIG. 3, at step 304 one or more of the systems described herein may detect another event that triggers another signature whose confidence score is unknown. For example, detection module 104 may, as part of one or more of computing devices 202(1)-(N) and/or server 206 in FIG. 2, detect event 222 that triggers signature 122. In this example, signature 122 may have yet to be assigned a confidence score. Accordingly, the confidence score of signature 122 may be unknown.

The systems described herein may perform step 304 in a variety of ways. In some examples, detection module 104 may detect event 222 while monitoring the health of a computing device. For example, detection module 104 may monitor computing device 202(1) for any evidence of malware attacks and/or infections. While monitoring computing device 202(1) for such evidence, detection module 104 may detect event 222 that triggers signature 122. In other words, detection module 104 may determine that signature 122 matches at least a partial representation of event 222.

Additionally or alternatively, detection module 104 may detect event 222 during a malware scan. For example, detection module 104 may initiate and/or participate in a malware scan on computing device 202(1). During this malware scan, detection module 104 may detect event 222 that triggers signature 122. In other words, detection module 104 may determine that signature 122 matches at least a partial representation of event 222.

As indicated above, the confidence score of signature 122 may be unknown. For example, signature 122 may have a confidence score 402 in FIG. 4. As shown in FIG. 4, confidence score 402 may indicate an unknown level of confidence in the accuracy of signature 122. In other words, confidence score 402 may indicate that the chance of signature 122 misdiagnosing a triggering event is unknown.

In one example, detection module 104 may detect an instance of event 222 on each of computing devices 202(1)-(N). In this example, computing devices 202(1)-(N) may represent a portion of a user base. Additionally or alternatively, computing devices 202(1)-(N) may represent portions of a plurality of user bases.

In one example, detection module 104 may detect various instances of event 222 within a certain time period of one another on computing device 202(1). For example, detection module 104 may detect 10 instances of event 222 on computing device 202(1) over a sliding 24-hour window of time. In this example, each of the 10 instances of event 222 may trigger signature 122 during the sliding 24-hour window of time.

Returning to FIG. 3, at step 306 one or more of the systems described herein may determine that the potentially malicious event and the other event occurred within a certain time period of one another. For example, determination module 106 may, as part of one or more of computing devices 202(1)-(N) and/or server 206 in FIG. 2, determine that potentially malicious event 220 and event 222 occurred within a certain time period of one another.

The systems described herein may perform step 306 in a variety of ways. In some examples, determination module 106 may determine that potentially malicious event 220 and event 222 occurred within a certain time period of one another based at least in part on their respective detection times. For example, determination module 106 may identify the point in time that potentially malicious event 220 was detected. In this example, determination module 106 may also identify the point in time that event 222 was detected. Determination module 106 may then determine that potentially malicious event 220 and event 222 occurred within a certain time period of one another by comparing the identified detection times.

In one example, determination module 106 may determine that potentially malicious event 220 and event 222 occurred substantially simultaneously. For example, determination module 106 may identify the point in time that potentially malicious event 220 was detected. Determination module 106 may then determine that event 222 was detected right before or right after that point in time. By doing so, determination module 106 may determine that potentially malicious event 220 and event 222 occurred substantially simultaneously.

In one example, determination module 106 may determine that potentially malicious event 220 and event 222 occurred within a certain time period of one another on each of computing devices 202(1)-(N). For example, determination module 106 may identify each point in time that potentially malicious event 220 was detected on computing devices 202(1)-(N). In this example, determination module 106 may also identify each point in time that event 222 was detected on computing devices 202(1)-(N). Determination module 106 may then determine that potentially malicious event 220 and event 222 occurred within a certain time period of one another on each of computing devices 202(1)-(N) by comparing the identified detection times.

In one example, determination module 106 may determine that potentially malicious event 220 and event 222 occurred within a certain time period of one another on computing device 202(1). For example, determination module 106 may determine that 5 potentially malicious events (including one or more instances of potentially malicious event 220) occurred on computing device 202(1) over a sliding 24-hour window of time. In this example, determination module 106 may also determine that 10 instances of event 222 occurred on computing device 202(1) over the same sliding 24-hour window of time.

Returning to FIG. 3, at step 308 one or more of the systems described herein may assign, to the other signature, a confidence score based at least in part on the potentially malicious event and the other event occurring within the certain time period of one another. For example, confidence module 108 may, as part of one or more of computing devices 202(1)-(N) and/or server 206 in FIG. 2, assign a confidence score to signature 122. In this example, confidence module 108 may initiate the assignment of this confidence score based at least in part on potentially malicious event 220 and event 222 occurring within a certain time period of one another. Additionally or alternatively, confidence module 108 may initiate the assignment of this confidence score in response to potentially malicious event 220 and event 222 occurring within a certain time period of one another.

The systems described herein may perform step 308 in a variety of ways. In some examples, confidence module 108 may assign the confidence score to signature 122 upon determining the confidence score for signature 122. For example, confidence module 108 may determine an amount of time that separated the occurrences of potentially malicious event 220 and event 222 on computing device 202(1). In this example, confidence module 108 may calculate a confidence score for signature 122 by applying the amount of time that separated the occurrences of potentially malicious event 220 and event 222 to an algorithmic function. Confidence module 108 may then assign this confidence score to signature 122.

In one example, confidence module 108 may apply the amount of time that separated the occurrences of potentially malicious event 220 and event 222 to a Gaussian function. For example, a Gaussian function may be expressed as G(Time(event 222)−Time(potentially malicious event 220))=exp(−1(Time(event 222)−Time(potentially malicious event 220))$^2$÷2$\sigma^2$ (where Time(event 222) represents the occurrence time of event 222, Time(potentially malicious event 220) represents the occurrence time of potentially malicious event 220, and $\sigma$ represents a constant that is customizable to achieve a particular result). By applying the amount of time that separated the occurrences of potentially malicious event 220 and event 222 to this Gaussian function, confidence module 108 may fairly accurately estimate a confidence score for signature 122 before completion of a full verification process that tries and tests signature 122 over a potentially lengthy period of time.

Figure 5:
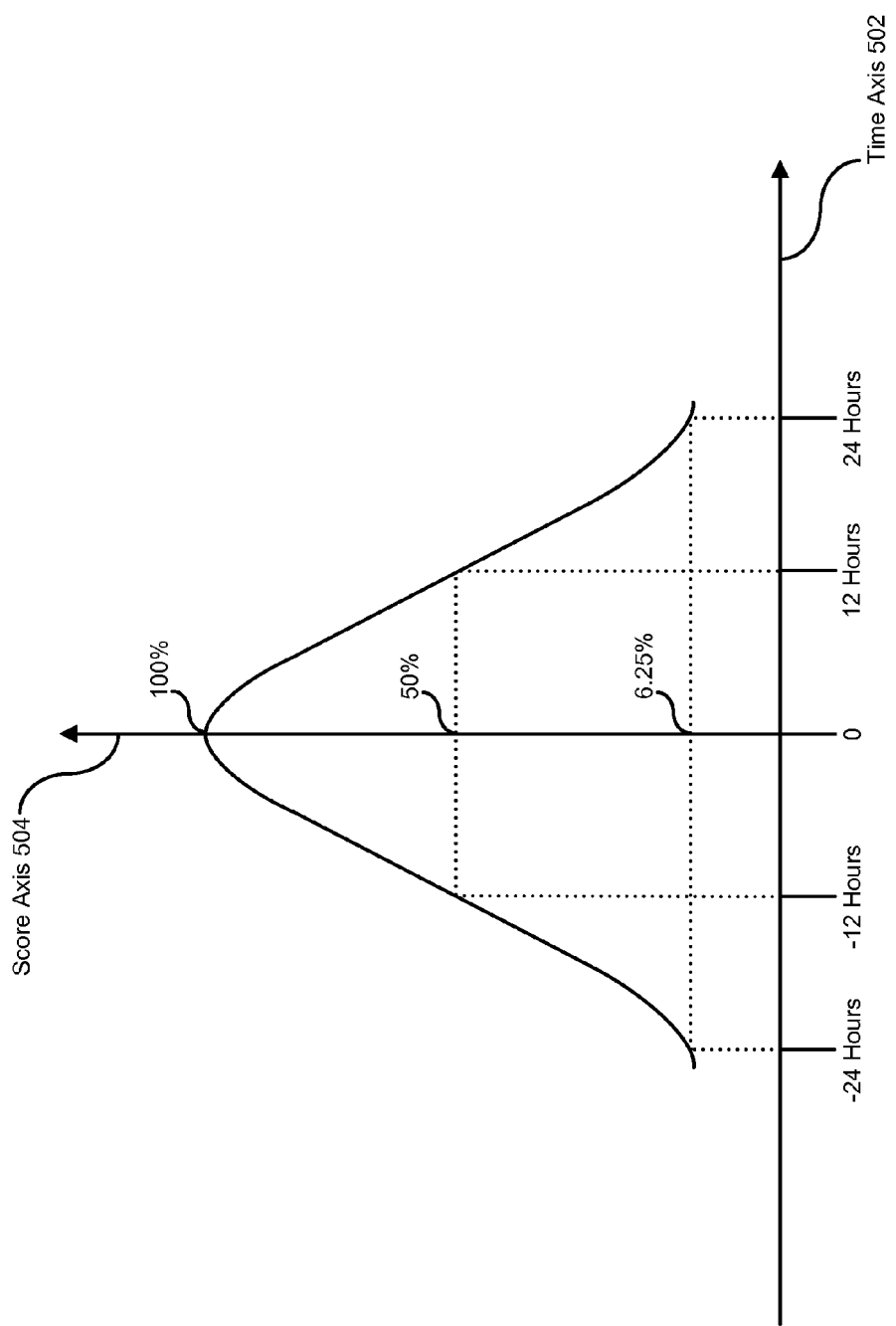
FIG. 5 is an illustration of an exemplary Gaussian distribution for estimating confidence scores of unverified signatures.

As a specific example, confidence module 108 may apply the amount of time that separated the occurrences of potentially malicious event 220 and event 222 to a Gaussian function with a Gaussian distribution 500 in FIG. 5. As shown in FIG. 5, Gaussian distribution 500 may be represented in connection with a time axis 502 corresponding to the amount of time that separated the occurrences of potentially malicious event 220 and event 222 as well as a score axis 504 corresponding to the confidence score yielded by applying that amount of time to the Gaussian function. In this example, the $\sigma$ constant in the Gaussian function may be set to approximately 0.42466 to achieve Gaussian distribution 500 in which (1) G(0 hours apart) yields a confidence score of approximately 100%, (2) G(12 hours apart) yields a confidence score of approximately 50%, and (3) G(24 hours or more apart) yields a confidence score of at most approximately 6.25%.

In one example, confidence module 108 may assign the confidence score to signature 122 to indicate the same level of confidence as the confidence score assigned to malware signature 120. For example, determination module 106 may determine that malware signature 120 has confidence score 400 in FIG. 4. As discussed above, confidence score 400 may indicate a 100% level of confidence in the accuracy of malware signature 120. In the event that potentially malicious event 220 and event 222 occurred substantially simultaneously, confidence module 108 may update and/or replace confidence score 402 in FIG. 4 with a confidence score of 100% to indicate the same level of confidence as confidence score 400.

In one example, confidence module 108 may assign the confidence score to signature 122 based at least in part on potentially malicious event 220 and event 222 occurring within a certain time period of one another on each of computing devices 202(1)-(N). For example, in the event that potentially malicious event 220 and event 222 occurred within a certain time period of one another on each of computing devices 202(1)-(N), confidence module 108 may assume, deduce, and/or infer that potentially malicious event 220 and event 222 have a relationship with one another. Confidence module 108 may then assign the confidence score to signature 122 due at least in part to this relationship between potentially malicious event 220 and event 222.

In one example, confidence module 108 may assign the confidence score to signature 122 based at least in part on potentially malicious events and one or more instances of event 222 occurring within a certain time period of one another on computing device 202(1). For example, confidence module 108 may calculate a confidence score for signature 122 based at least in part on (1) the number of potentially malicious events detected on computing device 202(1) over a certain window of time during which event 222 was also detected and (2) the confidence scores of these potentially malicious events. Confidence module 108 may then assign this confidence score to signature 122.

As a specific example, in the event that 5 potentially malicious events (including one or more instances of potentially malicious event 220) and 10 instances of event 222 occurred on computing device 202(1) over a sliding 24-hour window of time, confidence module 108 may calculate a confidence score for signature 122 by dividing the 5 potentially malicious events by the 10 instances of event 222 that occurred over the sliding 24-hour window of time. In other words, this confidence score may be calculated by determining the percentage yielded by 5÷10. This calculation may yield a confidence score of 50% for signature 122. Confidence module 108 may then assign the 50% confidence score to signature 122.

In some examples, confidence module 108 may update a signature database that facilitates distribution of signatures to computing devices within a user base to account for the confidence score assigned to the other signature. For example, confidence module 108 may identify a signature database (not illustrated in FIG. 2) maintained by server 206. This database may facilitate distribution of signatures to computing devices 202(1)-(N) via network 204. Confidence module 108 may update the signature database to account for the confidence score assigned to signature 122.

By updating the signature database to account for the confidence score assigned to signature 122, confidence module 108 may enable computing devices 202(1)-(N) to leverage the confidence score assigned to signature 122 in assessing suspicious events detected on computing devices 202(1)-(N). For example, upon completion of the update, the signature database may direct server 206 to distribute the confidence score to computing devices 202(1)-(N) via network 204. Computing devices 202(1)-(N) may then user and/or rely on this confidence score in assessing suspicious events.

In some examples, method 300 may include one or more additional steps not illustrated in FIG. 3. In one example, the various systems described herein may use confidence scores that have been estimated and/or derived via method 300 to estimate and/or derive further confidence scores. In other words, the various systems described herein may apply estimated and/or derived confidence scores as input into subsequent calculations for estimating and/or deriving confidence scores of unverified signatures.

As a specific example, detection module 104 may detect a potentially malicious event that triggers signature 122 whose confidence score is above a certain threshold. In this example, detection module 104 may also detect another event that triggers another signature (not illustrated in FIG. 1 or 2) whose confidence score is unknown. Determination module 106 may then determine that the potentially malicious event and the other event occurred within a certain time period of one another. In response to this determination, confidence module 108 may calculate a confidence score for the other signature based at least in part on the confidence score of signature 122.

Additionally or alternatively, the various systems described herein may modify, correct, and/or tune confidence scores that have been estimated and/or derived via method 300 by subjecting these confidence scores to subsequent iterations of method 300. In other words, the various systems described herein may apply estimated and/or derived confidence scores as input into subsequent calculations for modifying, correcting, and/or tuning such confidence scores. These systems may continue subjecting the estimated and/or derived confidence scores to iterations of method 300 until reaching a point at which further iterations would have little (if any) impact on the confidence scores.

As a specific example, detection module 104 may detect a potentially malicious event that triggers another malware signature (not illustrated in FIG. 1 or 2) whose confidence score is above a certain threshold. In this example, detection module 104 may also detect a subsequent event that triggers signature 122 whose initial confidence score was estimated and/or derived via method 300. Determination module 106 may then determine that the potentially malicious event and the subsequent event occurred within a certain time period of one another. In response to this determination, confidence module 108 may modify, correct, and/or tune the confidence score of signature 122 confidence score based at least in part on the confidence score of the other malware signature. In an effort to modify, correct, and/or tune the confidence score of signature 122 even further, these modules may continue performing such tasks until reaching a point at which further iterations would have little (if any) impact on the confidence score of signature 122.

As explained above in connection with method 300 in FIG. 3, a computer security system may leverage confidence scores of known high-confidence signatures to estimate confidence scores for unverified signatures. For example, a SIEM system may detect a phone-home connection of a known botnet that triggers a relatively old signature with a confidence score of approximately 100%. Shortly before or after this detection, the SIEM system may detect an event that triggers a relatively new signature with unknown confidence. Since certain malicious events tend to occur in fairly close time proximity to one another, the SIEM system may leverage the 100% confidence score of the old signature to estimate the confidence score of the new signature.

In this example, the SIEM system may apply the estimated confidence score to the new signature until the accuracy of the new signature has been sufficiently verified over time. By applying the estimated confidence score to the new signature in this way, the SIEM system may be able to derive certain value from the new signature even though the accuracy of the new signature has yet to be sufficiently verified over time.

Figure 6:
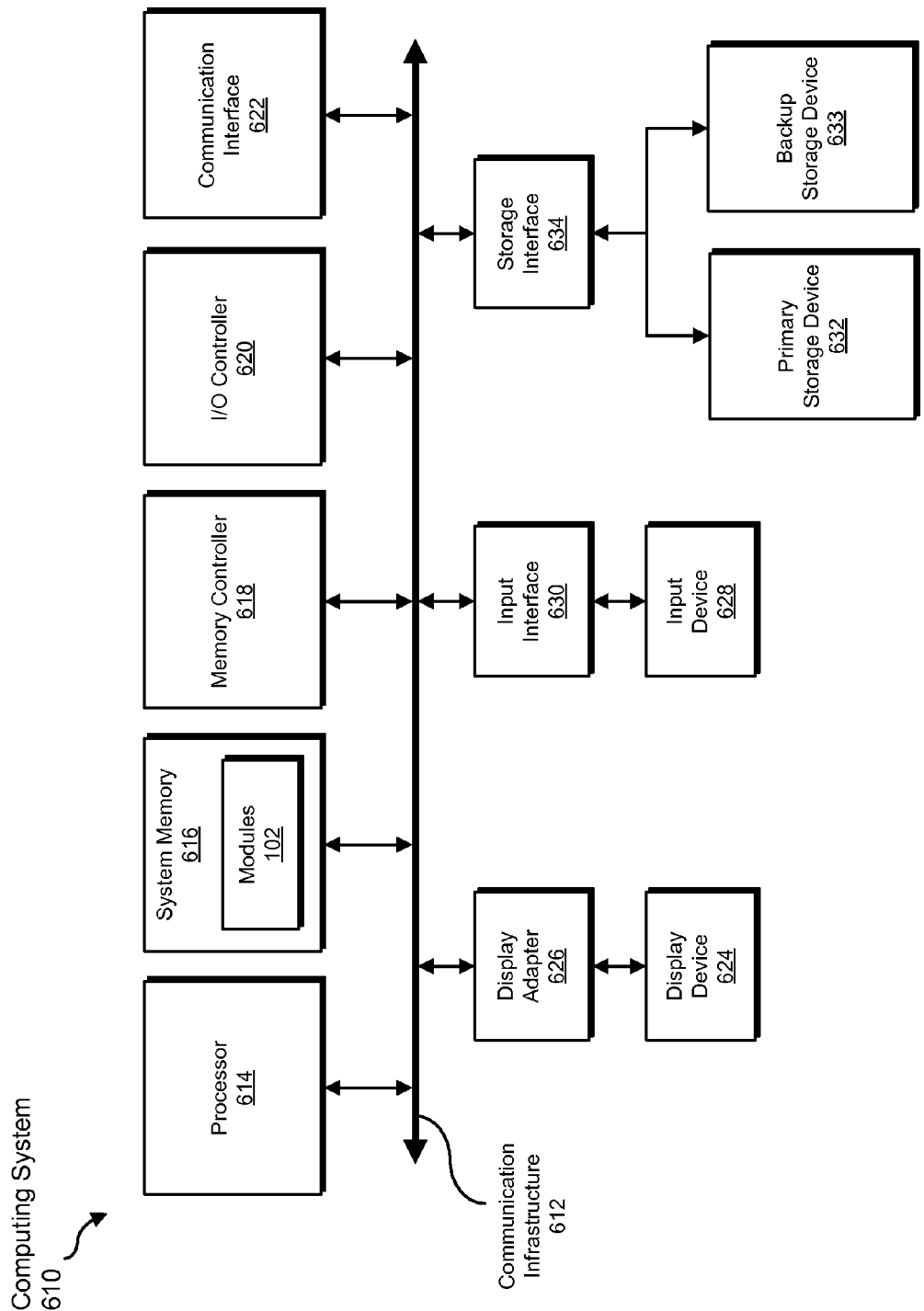
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630.

Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
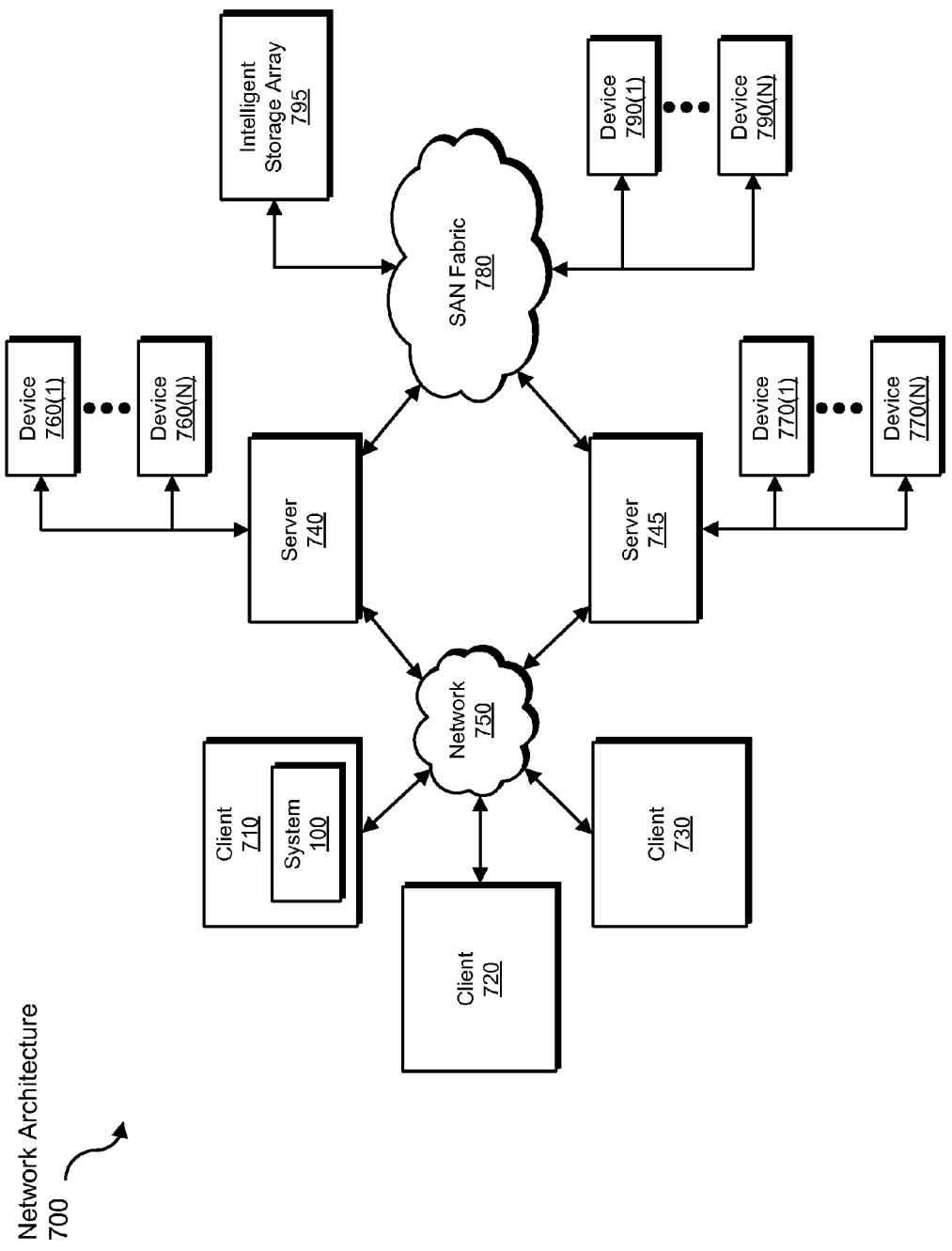
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for estimating confidence scores of unverified signatures.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a confidence score to be transformed, transform the confidence score, output a result of the transformation to facilitate assessing suspicious events based at least in part on the confidence score, use the result of the transformation to detect a malware attack with an increased level of confidence, and store the result of the transformation for future use. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for estimating confidence scores of unverified signatures, at least a portion of the method being performed by a computing device comprising at least one processor, the method comprising:
   detecting a potentially malicious event that triggers a malware signature designed to detect malware, the malware signature having a confidence score that:
     represents a level of confidence in the accuracy or reliability of the malware signature; and
     is above a certain threshold such that the malware signature's confidence score indicates a threshold level of confidence in the accuracy or reliability of the malware signature;
   detecting another event that triggers another signature designed to detect malware, the other signature having a confidence score that:
     represents a level of confidence in the accuracy or reliability of the other signature; and
     is unknown such that the other signature's confidence score indicates an unknown level of confidence in the accuracy or reliability of the other signature;
   determining that the potentially malicious event and the other event occurred within a certain time period of one another; and
   assigning, to the other signature, a confidence score based at least in part on the potentially malicious event and the other event occurring within the certain time period of one another.

2. The method of claim 1, wherein the malware signature's confidence score indicates a maximum level of confidence in the accuracy of the malware signature.

3. The method of claim 2, wherein assigning the confidence score to the other signature comprises:
   determining that the confidence score of the malware signature indicates the maximum level of confidence in the accuracy of the malware signature; and
   assigning, to the other signature, a confidence score that indicates a maximum level of confidence in the accuracy of the other signature based at least in part on the confidence score of the malware signature.

4. The method of claim 3, wherein:
   determining that the potentially malicious event and the other event occurred within the certain time period of one another comprises determining that the potentially malicious event and the other event occurred simultaneously; and
   assigning the confidence score that indicates the maximum level of confidence to the other signature comprises assigning, to the other signature, the confidence score that indicates the maximum level of confidence based at least in part on the potentially malicious event and the other event occurring simultaneously.

5. The method of claim 1, wherein assigning the confidence score to the other signature comprises:
   determining an amount of time that separated the occurrences of the potentially malicious event and the other event;
   calculating a confidence score for the other signature by applying the amount of time that separated the occurrences of the potentially malicious event and the other event to an algorithmic function; and
   assigning, to the other signature, the confidence score calculated by applying the amount of time to the algorithmic function.

6. The method of claim 5, wherein the algorithmic function comprises a Gaussian function.

7. The method of claim 1, wherein:
- detecting the potentially malicious event that triggers the malware signature comprises detecting the potentially malicious event on each of a plurality of computing devices;
- detecting the other event that triggers the other signature comprises detecting the other event on each of the plurality of computing devices;
- determining that the potentially malicious event and the other event occurred within the certain time period of one another comprises determining that the potentially malicious event and the other event occurred within the certain time period of one another on each of the plurality of computing devices; and
- assigning the confidence score to the other signature comprises assigning the confidence score to the other signature based at least in part on the potentially malicious event and the other event occurring within the certain time period of one another on each of the plurality of computing devices.

8. The method of claim 1, wherein:
- detecting the potentially malicious event that triggers the malware signature comprises detecting, on a single computing device, one or more potentially malicious events that trigger one or more malware signatures whose confidence scores are above a certain threshold and below another threshold;
- determining that the potentially malicious event and the other event occurred within the certain time period of one another comprises determining that the one or more potentially malicious events and the other event occurred within the certain time period of one another on the single computing device; and
- assigning the confidence score to the other signature comprises:
  - calculating a confidence score for the other signature based at least in part on:
    - the number of the one or more potentially malicious events detected on the single computing device; and
    - the confidence scores of the one or more potentially malicious events detected on the single computing device; and
  - assigning the calculated confidence score to the other signature.

9. The method of claim 1, wherein:
- detecting the potentially malicious event that triggers the malware signature comprises detecting one or more potentially malicious events that trigger one or more malware signatures whose confidence scores are above a certain threshold;
- detecting the other event that triggers the other signature comprises detecting one or more instances of the other event that triggers the other signature whose confidence score is unknown; and
- assigning the confidence score to the other signature comprises:
  - determining the number of the one or more potentially malicious events and the number of the one or more instances of the other event that occurred within a certain window of time;
  - calculating a confidence score for the other signature by dividing the number of the one or more potentially malicious events by the number of the one or more instances of the other event; and
  - assigning, to the other signature, the confidence score calculated by dividing the number of the one or more potentially malicious events by the number of the one or more instances of the other event.

10. The method of claim 1, wherein assigning the confidence score to the other signature comprises:
- updating a signature database that facilitates distribution of signatures to computing devices within a user base to account for the confidence score assigned to the other signature; and
- enabling, based at least in part on updating the signature database, the computing devices within the user base to leverage the confidence score assigned to the other signature in assessing suspicious events detected on the computing devices.

11. A system for estimating confidence scores of unverified signatures, the system comprising:
- a detection module, stored in memory, that:
  - detects a potentially malicious event that triggers a malware signature designed to detect malware, the malware signature having a confidence score that:
    - represents a level of confidence in the accuracy or reliability of the malware signature; and
    - is above a certain threshold such that the malware signature's confidence score indicates a threshold level of confidence in the accuracy or reliability of the malware signature;
  - detects another event that triggers another signature designed to detect malware, the other signature having a confidence score that:
    - represents a level of confidence in the accuracy or reliability of the other signature; and
    - is unknown such that the other signature's confidence score indicates an unknown level of confidence in the accuracy or reliability of the other signature;
- a determination module, stored in memory, that determines that the potentially malicious event and the other event occurred within a certain time period of one another;
- a confidence module, stored in memory, that assigns, to the other signature, a confidence score based at least in part on the potentially malicious event and the other event occurring within the certain time period of one another; and
- at least one physical processor that executes the detection module, the determination module, and the confidence module.

12. The system of claim 11, wherein the malware signature's confidence score indicates a maximum level of confidence in the accuracy of the malware signature.

13. The system of claim 12, wherein:
- the determination module determines that the confidence score of the malware signature indicates the maximum level of confidence in the accuracy of the malware signature; and
- the confidence module assigns, to the other signature, a confidence score that indicates a maximum level of confidence in the accuracy of the other signature based at least in part on the confidence score of the malware signature.

14. The system of claim 13, wherein:
- the determination module determines that the potentially malicious event and the other event occurred simultaneously; and
- the confidence module assigns, to the other signature, the confidence score that indicates the maximum level of confidence based at least in part on the potentially malicious event and the other event occurring simultaneously.

15. The system of claim 11, wherein:
the determination module determines an amount of time that separated the occurrences of the potentially malicious event and the other event; and
the confidence module:
   calculates a confidence score for the other signature by applying the amount of time that separated the occurrences of the potentially malicious event and the other event to an algorithmic function; and
   assigns, to the other signature, the confidence score calculated by applying the amount of time to the algorithmic function.

16. The system of claim 11, wherein:
the detection module:
   detects the potentially malicious event on each of a plurality of computing devices; and
   detects the other event on each of the plurality of computing devices;
the determination module determines that the potentially malicious event and the other event occurred within the certain time period of one another on each of the plurality of computing devices; and
the confidence assigns the confidence score to the other signature based at least in part on the potentially malicious event and the other event occurring within the certain time period of one another on each of the plurality of computing devices.

17. The system of claim 11, wherein:
the detection module detects, on a single computing device, one or more potentially malicious events that trigger one or more malware signatures whose confidence scores are above a certain threshold and below another threshold;
the determination module determines that the one or more potentially malicious events and the other event occurred within the certain time period of one another on the single computing device; and
the confidence module:
   calculates a confidence score for the other signature based at least in part on:
      the number of the one or more potentially malicious events detected on the single computing device; and
      the confidence scores of the one or more potentially malicious events detected on the single computing device; and
   assigns the calculated confidence score to the other signature.

18. The system of claim 11, wherein:
the detection module:
   detects one or more potentially malicious events that trigger one or more malware signatures whose confidence scores are above a certain threshold; and
   detects one or more instances of the other event that triggers the other signature whose confidence score is unknown;
the determination module determines the number of the one or more potentially malicious events and the number of the one or more instances of the other event that occurred within a certain window of time; and
the confidence module:
   calculates a confidence score for the other signature by dividing the number of the one or more potentially malicious events by the number of the one or more instances of the other event; and
   assigns, to the other signature, the confidence score calculated by dividing the number of the one or more potentially malicious events by the number of the one or more instances of the other event.

19. A non-transitory computer-readable medium comprising one or more computer-executable instructions that, when executed by at least one processor of a computing device, cause the computing device to:
   detect a potentially malicious event that triggers a malware signature designed to detect malware, the malware signature having a confidence score that:
      represents a level of confidence in the accuracy or reliability of the malware signature; and
      is above a certain threshold such that the malware signature's confidence score indicates a threshold level of confidence in the accuracy or reliability of the malware signature;
   detect another event that triggers another signature designed to detect malware, the other signature having a confidence score that:
      represents a level of confidence in the accuracy or reliability of the other signature; and
      is unknown such that the other signature's confidence score indicates an unknown level of confidence in the accuracy or reliability of the other signature;
   determine that the potentially malicious event and the other event occurred within a certain time period of one another; and
   assign, to the other signature, a confidence score based at least in part on the potentially malicious event and the other event occurring within the certain time period of one another.

20. The method of claim 1, wherein the other signature's confidence score is unknown due at least in part to the other signature having yet to be assigned a confidence score.

* * * * *